(12) United States Patent
Schulze

(10) Patent No.: US 6,575,219 B1
(45) Date of Patent: Jun. 10, 2003

(54) METHOD AND DEVICE FOR INTERLOCKING STACKWISE PLASTIC BAGS, ESPECIALLY BAGS FOR AUTOMATIC MACHINES, BY WELDING

(75) Inventor: Peter Schulze, Meerbusch (DE)

(73) Assignee: Lemo Maschinenbau GmbH, Niederkassel-Mondorf (DE)

( * ) Notice: Subject to any disclaimer, the term of this patent is extended or adjusted under 35 U.S.C. 154(b) by 0 days.

(21) Appl. No.: 09/763,786

(22) PCT Filed: Jul. 28, 1999

(86) PCT No.: PCT/EP99/05398

§ 371 (c)(1),
(2), (4) Date: Feb. 23, 2001

(87) PCT Pub. No.: WO00/12299

PCT Pub. Date: Mar. 9, 2000

(30) Foreign Application Priority Data

Aug. 28, 1998 (DE) .......................................... 198 39 155

(51) Int. Cl.⁷ .............................................. B32B 31/20
(52) U.S. Cl. ...................... 156/514; 156/515; 156/513; 156/583.2; 156/583.1; 493/204; 493/206
(58) Field of Search .................................. 156/513, 514, 156/252, 583.1, 583.2, 515, 571, 572; 493/202, 203, 204, 205, 206

(56) References Cited

U.S. PATENT DOCUMENTS

| 3,917,505 A | | 11/1975 | Schulze |
| 4,021,291 A | * | 5/1977 | Joice .......................... 156/252 |
| 4,670,083 A | | 6/1987 | Membrino |
| 6,113,716 A | * | 9/2000 | Schramayr et al. ........... 156/64 |

FOREIGN PATENT DOCUMENTS

EP 0 384 281 A1 8/1990

* cited by examiner

*Primary Examiner*—Curtis Mayes
*Assistant Examiner*—George R. Koch, III
(74) *Attorney, Agent, or Firm*—Herbert Dubno

(57) ABSTRACT

The invention relates to a method and a device for interlocking stackwise plastic bags, especially bags for automatic machines, by welding, wherein welding is effected by an interlocking device (21) integrated into the grip hand (17) of a robot (16) with the purpose of simplifying welding.

11 Claims, 5 Drawing Sheets

METHOD AND DEVICE FOR INTERLOCKING STACKWISE PLASTIC BAGS, ESPECIALLY BAGS FOR AUTOMATIC MACHINES, BY WELDING

CROSS REFERENCE TO RELATED APPLICATIONS

This application is the US national stage of PCT/EP99/05398 filed Jul. 28, 1999 and is based upon German national application 19839155.2 filed Aug. 28, 1998 under the International Convention.

FIELD OF THE INVENTION

The invention relates to a method for interlocking plastic bags in stacks, particularly bags for automated machines, through fusion.

BACKGROUND OF THE INVENTION

In the plastic bags of the discussed kind, particularly bags for automated machines, it is known that during manufacturing the bags are provided with suspension or stacking openings, in order to enable them to be deposited in packages, immediately after production, on the stacking pins of a stacking chain, thereby forming a stack of bags. When a sufficient number of bags have been stacked on each pair of stacking pins, the respective pair of stacking pins is moved further, so that on the next pair of stacking pins of the driven revolving stacking pin chain, stacks of bags can again be formed. In order to insure that in each stack the individual plastic bags can be kept together, an interlocking is performed directly on the stacking pin chain. For the interlocking an interlocking station is required. The latter is not only expensive, but also requires a large amount of space, so that the stacking pin chain is relatively long. Bag stacks of the mentioned kind are known from the German Utility Model 74 29 628. For the interlocking of the bag stacks so-called glow plugs or glow pegs, which after being intensely heated are pushed through the stack of bags. optionally an opening can be stamped prior to that at the punch-through location. The interlocking of the plastic bags in the bag stack takes place directly downstream of the actual stacking process, i.e. within the area of the pin stacking conveyor. At the end of the pin stacking conveyor the interlocked bag stack is removed by an operator, optionally again examined for quality control and finally delivered to a transport station.

In the case of bag stacks which are not interlocked by fusion but are interconnected by the insertion of a wire bracket with additional safety plates or rubber stoppers, due to the numerous steps required for the formation of a bag stack, it has also become known to replace the manual handling by a robot, as described and represented in detail in EP 0 384 281 A1.

OBJECT OF THE INVENTION

It is the object of the invention to provide a low-cost method of the kind mentioned in the introduction, through which the stacking of bags into a block (stack or pad) and the securing of the stacked bags by fusion is further simplified.

SUMMARY OF THE INVENTION

In order to achieve this object, in a method of the kind discussed at the outset, the interlocking of the plastic bags in the stack is effected through fusion after the bag stack is seized and clamped by a grip hand of the robot, by means of an interlocking device. According to the invention the bag stack is held on a pair of stacking pins and is seized by clamping by the robot grip hand and subjected to fusion immediately thereafter. At very high production speeds, the interlocking of the bag stack can even take place during the transport of the bag stack to a transfer station by the robot. This means that no additional time is required for the interlocking; moreover the transport time which is anyway needed by the robot between the pickup of the bag stacks from the pin stacking conveyor and the transfer to the delivery station is used for interlocking.

In the new system the interlocking device for the housing and the clamping mechanism are eliminated. Besides the stations freely suspended stations provided in the pin stacking chain for interlocking purposes can be used for manual or automated correction and supervision functions.

If necessary, the interlocked bag stacks can be suspended via stacking holes in the transfer station, for intermediate storage. In this way the interlocking locations have enough time to cool down, so that the bag stacks interlocked according to the invention can be packed into cardboard boxes relatively quick.

According to the invention a suitable device for the stackwise interlocking of plastic bags, particularly bags for automated machines, through fusion by means of an interlocking device is designed so that the interlocking device is integrated in a grip hand of the robot which picks up the bag stack from a stack-forming device and transfers it to a delivery station. In this way the grip hand of the robot takes over not only transport tasks, but at the same time performs the stack formation, whereby an essentially disturbance-free handling of the bag stack from its pickup from the pin stacking conveyor up to the transfer to the delivery station results.

In a suitable embodiment of the invention, the interlocking device is fastened to a mounting plate of the grip hand, namely ideally on a cross-section preferably having T-shaped grooves, which is adjustably supported on the mounting plate. In this way an adjustment to the respective format of the plastic bags is possible. For the fusion itself, it is sufficient to provide a heat source, for instance two glow plugs arranged at a distance from each other and a cylinder-piston unit, for instance in the form of a pneumatic cylinder, for their adjustment.

It has proven to be particularly suitable when the glow plugs are arranged respectively in the area of a first clamping bar of the grip hand, which is adjustable with respect to the second clamping bar of the grip hand, as well as to the glow plugs.

Optimal conditions for the clamping and the interlocking result when both glow plugs are arranged outside the clamping locations of the clamping bars of the grip hand.

In this way it is relatively simple to design the upper clamping bar as a wiper for the interlocked bag stack, when for instance the clamping bar is provided with a passage opening for the respectively arranged glow plugs.

BRIEF DESCRIPTION OF THE DRAWING

A preferred embodiment of the invention is shown in the drawing and is subsequently described in greater detail. In the drawing.

SPECIFIC DESCRIPTION

Figure 1:
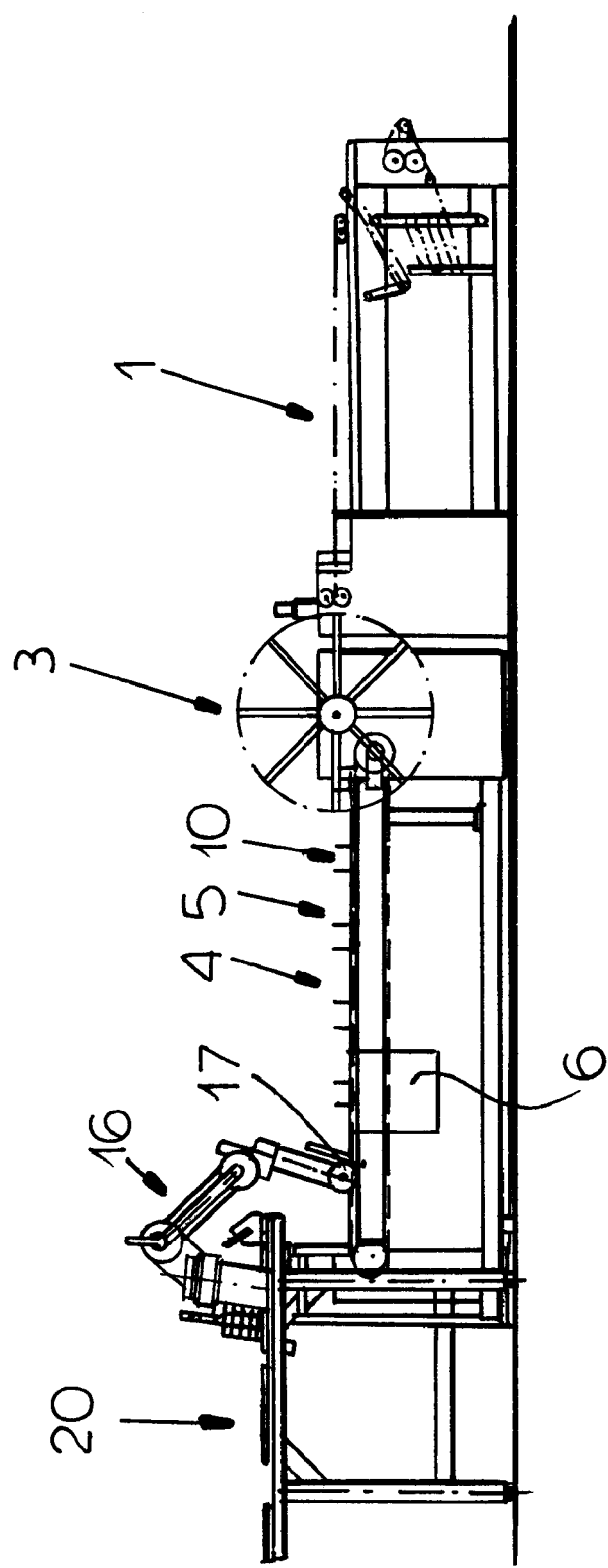
FIG. 1 is a side view of a machine for the production of plastic bags with a pin stacking conveyor and a robot downstream thereof with a grip hand having an integrated interlocking device.
Figure 3:
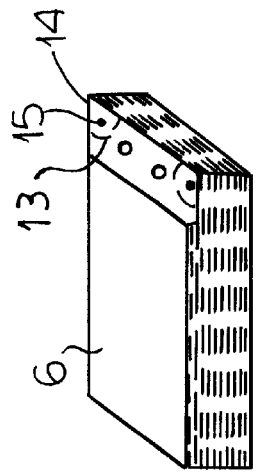
FIG. 3 is a perspective representation of a separate plastic bag.

In FIG. 1 a bag-producing machine 1 is schematically represented, which is designed and equipped for the production of plastic bags 2 (FIG. 3), particularly of so-called automatic plastic bags. Each plastic bag 2 has in the area of a filling opening 7 a flap 8 projecting at one side, in which two suspension holes 9 are stamped and which are associated with tear-off perforation slots 12 at a small distance from the outer edge 11.

Figure 4:
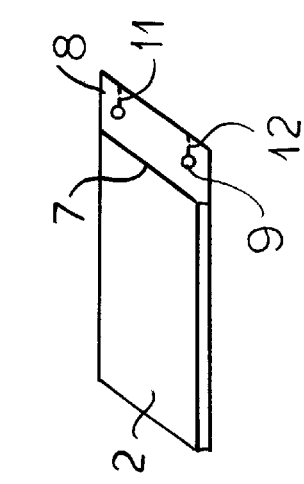
FIG. 4 is a corresponding representation of an interlocked bag stack consisting of several plastic bags.

The aforedescribed plastic bags are produced from a thermoplastic foil web, which is unwound from a roll by an unwinding stand not shown in the drawing and which can be shaped as a tubular foil web. Inside the bag-producing machine 1 the tubular foil web is guided over driving rollers and a tensioning roller not shown in the drawing. By means of a hole-punching mechanism and a crosscut-welding device not shown in the drawing, the above-described plastic bags 2 can be produced in the known manner. Downstream of the crosscut-welding device a transfer device 3 is provided, which is finally followed by a pin stacking conveyor 4 with a stepwise revolving driven pin stacking chain 5. On the pin stacking chain 5, upright standing stacking pins 10 are fastened in pairs spaced from one another. On each of the pairs of pins a bag stack as marked with 6 in FIG. 1 and FIG. 4 can be formed downstream of the transfer device 3 in the known manner. On the pin stacking conveyor chain 5 the plastic bags are held merely via the stacking pins 10. For further handling, particularly for the transport of the bag stack 6, the bag stacks 6 have to be interlocked, for instance in the manner shown in FIG. 4. In the corner areas 14 separated in the marginal area 8 by perforation lines 13, interlocking points 15 are produced in a manner which will be described in detail, through which all the plastic bags 2 in the stack are interlocked. Bag stacks interlocked this way can be picked up with the aid of a robot 16 arranged at the end of the pin stacking conveyor, by means of a grip hand 17 and, according to a predetermined control, transferred to a magazine station 18 of a discharge station 20.

Figure 7:
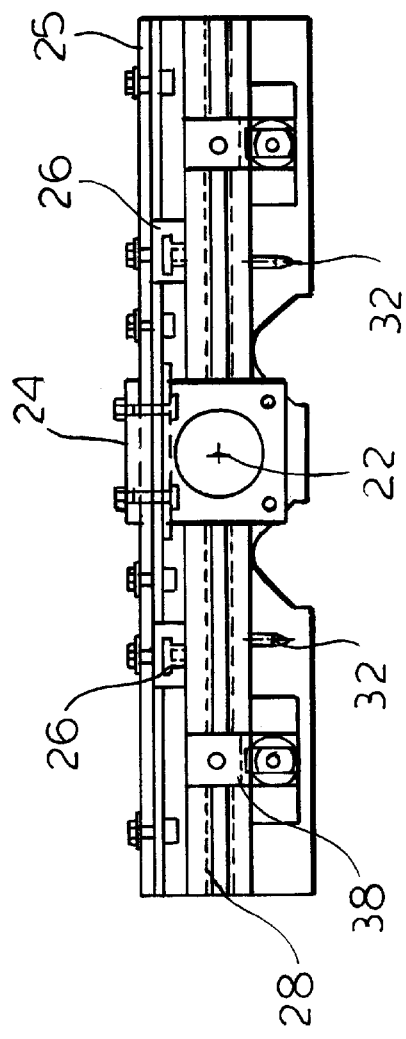
FIG. 7 is a top view on the grip hand.

The robot 16 with its grip hand, has a multiple function. So for instance by means of the robot arm (FIG. 1), the bag stack 6 can not only be picked up from the pin stacking conveyor 4 and transferred to the discharge station, but at the same time the grip hand 17 can be provided with an interlocking station 21, which results in detail from FIGS. 5 to 7. The grip hand 17 is supported by a cylinder-piston unit 22, which is swingably supported on an outrigger of the robot 16 at 23. The cylinder-piston unit 22 rests on angle piece 24, on which a substantially trapezoidal mounting plate 25 is fastened. The mounting plate 25, advantageously made of corrugated aluminum sheet, has on its frontal side two spaced-apart guide bars 26, wherein a crossbeam 28 is axially slidable via a guide element 27. The crossbeam 28 has several grooves which in cross section are T-shaped. In the individual grooves are guided the guide element 27 and a ram 29 of the cylinder-piston unit 22, while on the frontal side an L-shaped clamping bar 31 and on the underside angled catch pins 32, whose distance corresponds to the distance between the suspension holes 9 in the plastic bags 2. In cooperation with the upper clamping bar 31, a lower clamping bar 33 is fastened to the lower end of the mounting plate 25. Both clamping bars can be covered with a plastic lining. In the represented embodiment example, the upper clamping bar 31 is formed by two clamping bar sections arranged at a distance from each other.

Figure 5:
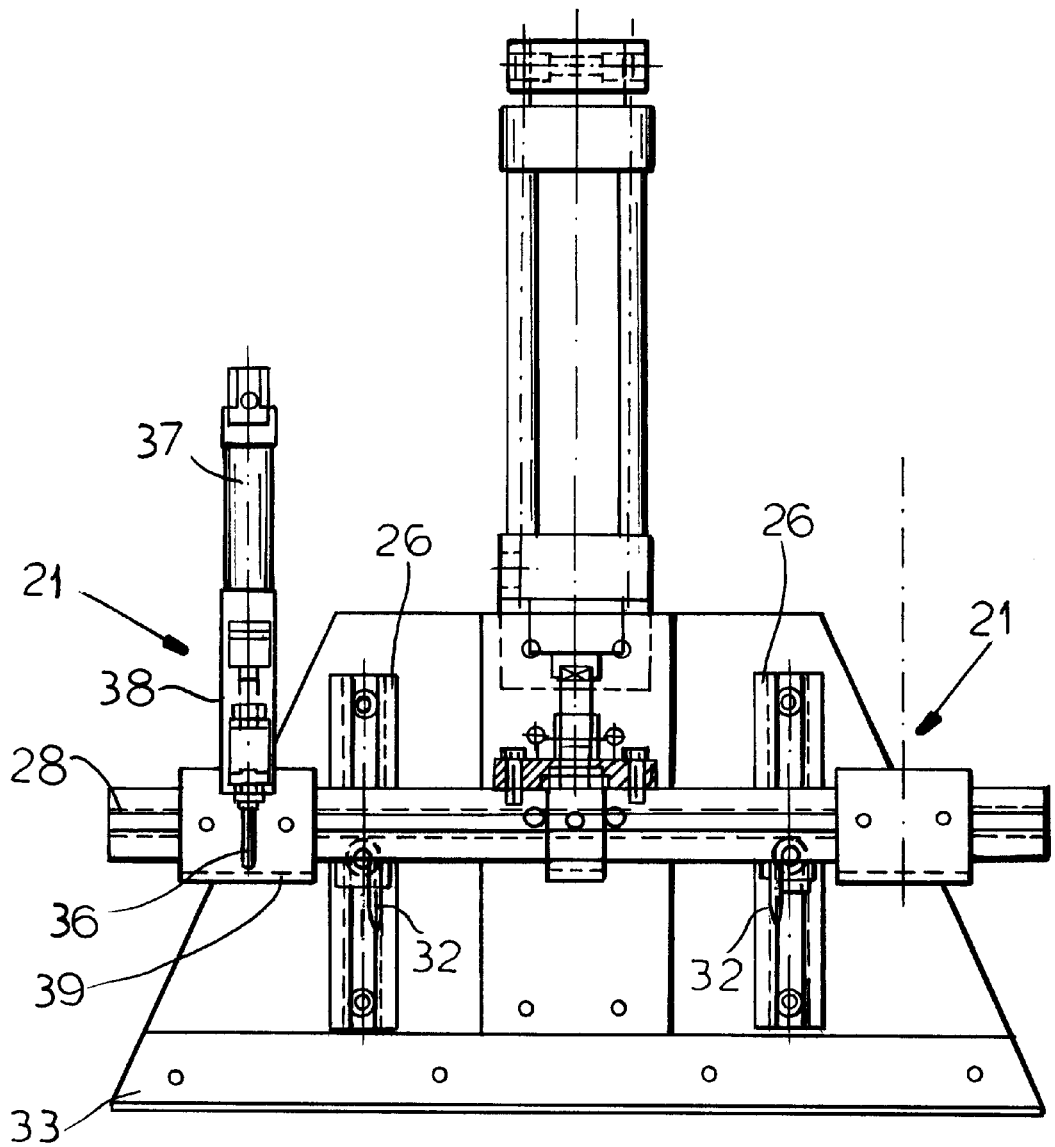
FIG. 5 is a frontal view of grip hand of the robot with integrated interlocking device.
Figure 6:
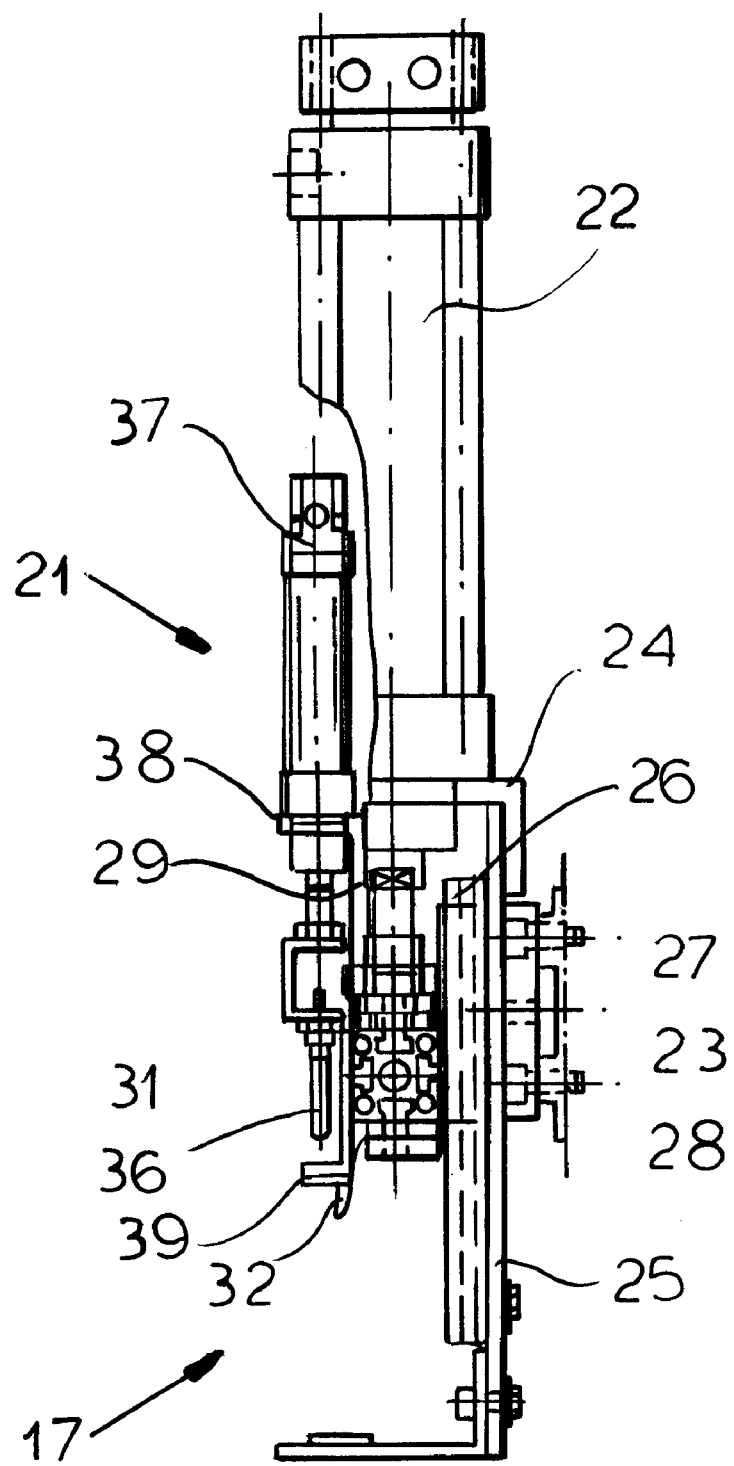
FIG. 6 is the pertaining side view.

The above-mentioned interlocking device 21 has a heat source in the form of two spaced-apart glow plugs 36, of which in FIG. 5 only the glow plug on the left side is shown. The glow plug arranged on the right side with its actuation device is identically designed and therefore not represented in detail. Glow plugs, respectively glow pegs of the illustrated kind are known per se. In any case, a cylinder-piston unit 37, in the form of a pneumatic cylinder, is required for the axial displacement of the glow plug 36. The cylinder-piston unit is adjustably fastened on the cross-section 28 by means of a holder 38. The upper clamping bar 31 has a passage opening 39 for the glow plug 36. The distance between the two glow plugs 36 lies outside the range of the catch pins 32.

Figure 2:
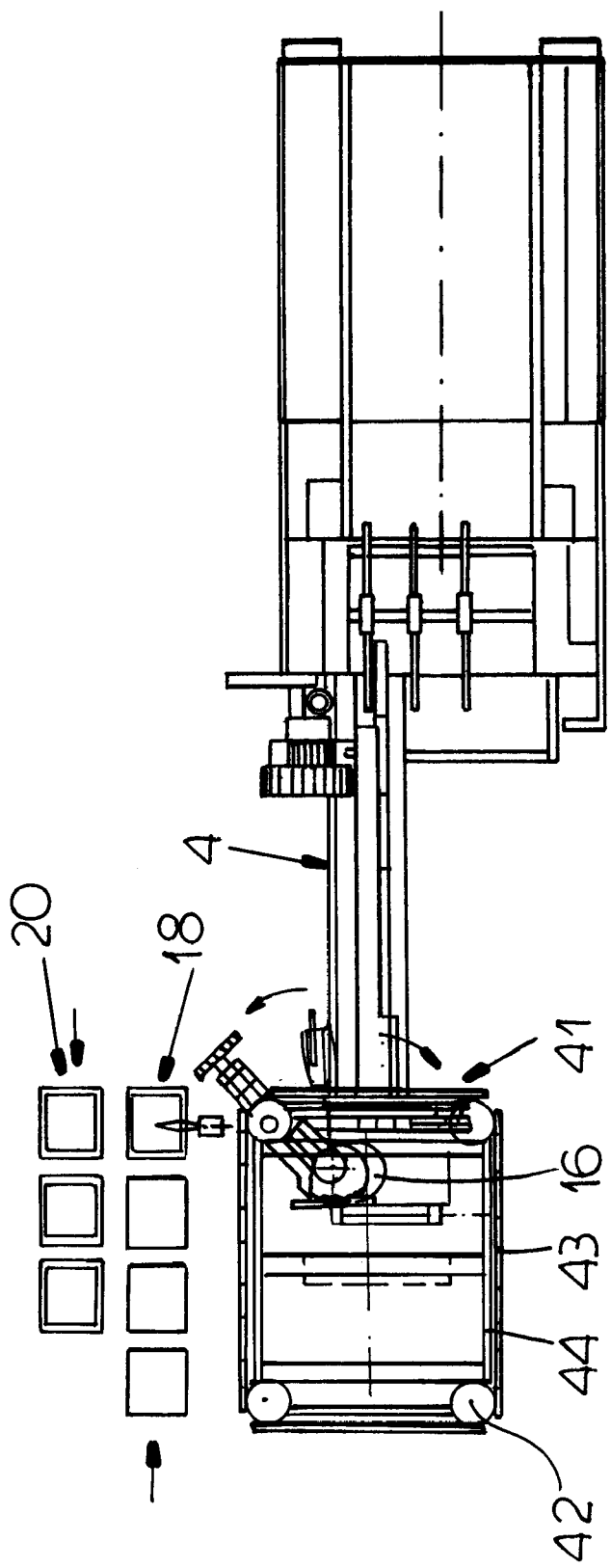
FIG. 2 is a top view of the machine shown in FIG. 1.

The device according to the invention works as follows:

After a bag stack 6 is formed in the pin stacking conveyor 4, each bag stack 6 reaches the position shown in FIG. 1. There the bag stack, which is not yet interlocked, is clampingly held between the clamping bars 31 and 33 of the grip hand 17 of the robot 16, whereby the catch pins 32 engage in the suspension holes 9 of the plastic bags. Immediately after the bag stack is seized and gripped, the interlocking of the bag stack takes place through fusion with the aid of the interlocking device 21 integrated in the grip hand 17 of the robot 16. For the purpose of interlocking during the clamping of the bag stack, the glow plugs 36 serving as a heat source are pushed into the bag stack by means of the pneumatic cylinders 37, namely in the corner areas 14, in order to form the interlocking locations 15 according to the bag package shown in FIG. 4. This interlocking takes place either still in the pin stacking device, or more suitably, after the seizing and clamping of the bag stack, the transport of the bag stack to a delivery or discharge station is carried out. Preferably the interlocking is also performed during this transport motion. After a short dwelling time in the bag stack, the glow plug is retracted and the glow plug is brought to its rest position so that the interlocking locations can be cooled. During retraction, the upper clamping bar 31 functions as a wiper. After interlocking, the bag package can immediately be brought to the discharge station 20 by means of the grip hand of the robot 16, as shown in FIG. 2.

Alternatively it is also possible to bring the interlocked bag stack 6 to an intermediate storage, so that the interlocking locations can cool down. This can be for instance done by bringing the bag stack to a control unit 41 (FIG. 2). From this control unit the bag stacks can be manually boxed, or again be boxed by means of the robot. Finally for cooling the bags can suspended on a plate carousel. Such a plate carousel is indicated in FIG. 2 and comprises guide rollers 42 with mounting plates 43 and brackets 44 fastened thereto.

It has been found that due to the arrangement of the robot at the end of the pin stacking conveyor and to its multiple uses for the transport of the bag stacks, as well as for the their interlocking, a universal use possibility is given for a great variety of bags, such as shirt-containing bags, which are interlocked according to the invention.

I claim:

1. An apparatus for producing stacks of interlocked plastic bags, comprising:

a bag-making machine for producing a succession of plastic bags and including a conveyor having locations each receiving a multiplicity of said bags;

a robot arm having a gripper hand engageable with each multiplicity of bags for lifting same from the respective location and transporting the respective multiplicity of bags away from said conveyor, said gripper hand having:

a support engageable beneath the respective multiplicity of bags and along an edge thereof, a clamping member displaceable toward said support for clamping the respective multiplicity of bags between the clamping member and the support, and means on said hand for interlocking the respective multiplicity of bags while the respective multiplicity of bags is clamped between said clamping member and said support; and a discharge station spaced from said conveyor for receiving each stack of interlocked bags from said gripper hand.

2. An apparatus for producing stacks of interlocked plastic bags, comprising:

a bag-making machine for producing a succession of plastic bags and including a conveyor having spaced apart pairs of pins each receiving a multiplicity of said bags with the pins of the respective pair engaging through the bags along an edge there of;

a robot arm having a gripper hand engageable with each multiplicity of bags for lifting same from the respective pair of pins and transporting the respective multiplicity of bags away from said conveyor, said gripper hand having:

a support engageable beneath the respective multiplicity of bags and along said edges thereof, a clamping member displaceable toward said support for clamping the respective multiplicity of bags between the clamping member and the support, and a pair of heated members on said hand adapted to press against the respective multiplicity of bags for interlocking the respective multiplicity of bags while the respective multiplicity of bags is clamped between said clamping member and said support; and a discharge station spaced from said conveyor for receiving each stack of interlocked bags from said gripper hand.

3. The apparatus defined in claim 2 wherein said gripper hand comprises a mounting plate, a holder having grooves which are T-shaped in cross section and adjustably supported on said mounting plate and a pair of piston and cylinder units adjustably mounted on said holder and respectively carrying said heated members for pressing said heated members against the respective multiplicity of bags while said respective multiplicity of bags is clamped between said clamping member and said support.

4. The apparatus defined in claim 3 wherein said clamping member of said gripper hand comprises a first clamping bar guided on said mounting plate and provided with a piston and cylinder unit for pressing said first clamping bar against the respective multiplicity of bags along said edges thereof and a second clamping bar fixed to said plate and forming said support.

5. The apparatus defined in claim 4 wherein said heated members are glow plugs.

6. The apparatus defined in claim 5 wherein said first clamping bar has holes through which said glow plugs pass.

7. The apparatus defined in claim 6 wherein said first clamping bar is provided with a pair of spaced-apart catch pins engageable through said bags upon displacement of said first clamping bar toward said second clamping bar.

8. The apparatus defined in claim 7 wherein said glow plugs are located outwardly of said catch pins of said first clamping bar.

9. The apparatus defined in claim 2 wherein said clamping member is a first clamping bar and said support is a second clamping bar, said clamping bars engaging the respective multiplicity of bags between them, said first clamping bar having a pair of catch pins engageable in said bags, said heated members being glow plugs adapted to be pressed into the respective multiplicity of bags.

10. The apparatus defined in claim 9 wherein said glow plugs pass through holes formed in said first clamping bar.

11. The apparatus defined in claim 10 wherein said glow plugs are located outwardly of said catch pins along said first clamping bar.

\* \* \* \* \*